US012711417B2

(12) United States Patent
He et al.

(10) Patent No.: US 12,711,417 B2
(45) Date of Patent: Aug. 18, 2026

(54) METHOD AND APPARATUS WITH OPTIMIZATION FOR DEEP LEARNING MODEL

(71) Applicant: Samsung Electronics Co., Ltd., Suwon-si (KR)

(72) Inventors: Wenlong He, Xi'an (CN); Ihor Vasyltsov, Suwon-si (KR); Gang Sun, Xi'an (CN); Duanhui Liu, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 1022 days.

(21) Appl. No.: 17/587,291

(22) Filed: Jan. 28, 2022

(65) Prior Publication Data

US 2022/0237513 A1 Jul. 28, 2022

(30) Foreign Application Priority Data

Jan. 28, 2021 (CN) ......................... 202110120437.9
Nov. 15, 2021 (KR) ....................... 10-2021-0156647

(51) Int. Cl.
*G06F 18/214* (2023.01)
*G06F 18/2132* (2023.01)
(Continued)

(52) U.S. Cl.
CPC ....... *G06N 20/00* (2019.01); *G06F 18/21322* (2023.01); *G06F 18/214* (2023.01); *G06N 7/01* (2023.01); *G06F 18/21326* (2023.01)

(58) Field of Classification Search
CPC .... G06N 20/00; G06N 7/01; G06F 18/21322; G06F 18/214; G06F 18/21326
See application file for complete search history.

(56) References Cited

U.S. PATENT DOCUMENTS

2019/0042948 A1 2/2019 Lee et al.
2019/0050710 A1 2/2019 Wang et al.
(Continued)

FOREIGN PATENT DOCUMENTS

CN 107480770 A 12/2017
CN 110555508 A 12/2019
(Continued)

OTHER PUBLICATIONS

Wu, B., et al., Mixed Precision Quantization of ConvNets via Differentiable Neural Architecture Search, [received Mar. 25, 2025]. Retrieved from Internet :<https://arxiv.org/abs/1812.00090> (Year: 2018).*
(Continued)

*Primary Examiner* — Miranda M Huang
*Assistant Examiner* — Bart I Rylander
(74) *Attorney, Agent, or Firm* — NSIP Law

(57) ABSTRACT

A method with quantization for a deep learning model includes: determining a second model by quantizing a first model based on a quantization parameter; determining a real value of multi optimization target parameter by testing the second model; calculating a loss function based on the real value of the multi optimization target parameter, an expected value of the multi optimization target parameter, and a constraint value of the multi optimization target parameter; updating the quantization parameter based on the loss function and using the second model as the first model; iteratively executing the foregoing operations until a preset condition is satisfied; and in response to the preset condition being satisfied, determining an optimal quantization parameter and using, as a final quantization model, the first model that executes quantization based on the optimal quantization parameter.

20 Claims, 8 Drawing Sheets

(51) Int. Cl.
*G06N 7/01* (2023.01)
*G06N 20/00* (2019.01)

(56) References Cited

U.S. PATENT DOCUMENTS

| | | | | |
|---|---|---|---|---|
| 2019/0188557 | A1 | 6/2019 | Lowell et al. | |
| 2020/0125947 | A1 | 4/2020 | Park et al. | |
| 2020/0218962 | A1 | 7/2020 | Lee et al. | |
| 2021/0350233 | A1 * | 11/2021 | Saboori | G06N 3/088 |

FOREIGN PATENT DOCUMENTS

| | | | |
|---|---|---|---|
| CN | 110610237 | A | 12/2019 |
| CN | 110852439 | A | 2/2020 |
| CN | 111091184 | A | 5/2020 |
| CN | 111582432 | A | 8/2020 |
| CN | 110348562 | B | 10/2021 |
| WO | WO 2020/102888 | A1 | 5/2020 |

OTHER PUBLICATIONS

Ma, X. et al., A Bayesian Optimization Framework for Neural Network Compression, [received Mar. 25, 2025]. Retrieved from Internet :<https://openaccess.thecvf.com/content_ICCV_2019/html/Ma_A_Bayesian_Optimization_Framework_for_Neural_Network_Compression_ICCV_2019_paper.html> (Year: 2019).*

Wang, K., et al., HAQ: Hardware-Aware Automated Quantization with Mixed Precision, [received Mar. 25, 2025]. Retrieved from Internet :<https://openaccess.thecvf.com/content_CVPR_2019/html/Wang_HAQ_Hardware-Aware_Automated_Quantization_With_Mixed_Precision_CVPR_2019_paper.html> (Year: 2019).*

Wu, H., et al., Integer Quantization for Deep Learning Inference: Principles and Empirical Evaluation, [received Nov. 5, 12025]. Retrieved from Internet :<https://arxiv.org/abs/2004.09602> (Year: 2020).*

Li, Fengfu, et al. "Ternary weight networks." *30th Conference on Neural Information Processing Systems* (*NIPS*) *Barcelona, Spain* arXiv:1605.04711v2 Nov. 19, 2016 (5 pages in English).

Zhou, Shuchang, et al. "Dorefa-Net: Training Low Bitwidth Convolutional Neural Networks With Low Bitwidth Gradients" arXiv:1606:06160v3 Feb. 2, 2018 (13 pages in English).

Choi, Jungwook, et al. "Pact: Parameterized Clipping Activation for Quantized Neural Networks." arXiv:1805.06085v2 Jul. 17, 2018 (15 pages in English).

Wang, Kuan, et al. "HAQ: Hardware-Aware Automated Quantization with Mixed Precision." *Proceedings of the IEEE/CVF Conference on Computer Vision and Pattern Recognition*. 2019 pp. 8612-8620.

Elthakeb, Ahmed T., et al. "Releq: A Reinforcement Learning Approach for Automatic Deep Quantization of Neural Networks." *IEEE Micro vol. 40 Issue 5* Jul. 16, 2020 (7 pages in English).

"NVIDIA Tensor RT" Nvidia Developer Dec. 30, 2021 https://developer.nvidia.com/tensorrt (5 pages in English).

Sze, Vivienne, et al. "Efficient Processing of Deep Neural Networks: from Algorithms to Hardware Architectures" NeurIPS 2019 https://tinyurl.com/SzeNeurIPS2019 (138 pages in English).

Apache TVM Documentation Dec. 30, 2021 https://tvm.apache.org/docs/ (1 page in English).

* cited by examiner

METHOD AND APPARATUS WITH OPTIMIZATION FOR DEEP LEARNING MODEL

CROSS-REFERENCE TO RELATED APPLICATIONS

This application claims the benefit under 35 USC § 119(a) of Chinese Patent Application No. 202110120437.9, filed on Jan. 28, 2021 in the China National Intellectual Property Administration, and Korean Patent Application No. 10-2021-0156647, filed on Nov. 15, 2021 in the Korean Intellectual Property Office, the entire disclosures of which are incorporated herein by reference for all purposes.

BACKGROUND

1. Field

The following description relates to a method and apparatus with optimization for a deep learning model.

2. Description of Related Art

Artificial intelligence (AI) technology may enable various applications of AI. Among them, deep learning may be implemented to perform computer vision, language processing, text processing, and the like. Deep learning may be applied to mobile terminals and data center services. However, deep learning may require high computing performance, greater memory occupancy, and greater power consumption from hardware devices to which deep learning is applied or with which deep learning is implemented. Thus, there may be a greater load in applications of mobile terminals or data center services.

Among related technologies, a quantization deep learning model (e.g., a neural network model)-based technology may reduce energy consumption and inference latency using a low-precision and low-power neural network chip (e.g., a neural processing unit (NPU), a tensor processing unit (TPU), a field-programmable gate array (FPGA), etc.), and may thus be suitable for applications of mobile terminals or data center services.

The quantization deep learning model-based technology may require a fine adjustment to restore accuracy because a training convergence speed of a quantization model to be trained with perceptual quantization may be reduced, a compression effect of a quantized model may be restricted when the model is quantized with a fixed precision, and low-precision quantization may have a great loss in terms of accuracy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with quantization for a deep learning model includes: determining a second model by quantizing a first model based on a quantization parameter; determining a real value of multi optimization target parameter by testing the second model; calculating a loss function based on the real value of the multi optimization target parameter, an expected value of the multi optimization target parameter, and a constraint value of the multi optimization target parameter; updating the quantization parameter based on the loss function and using the second model as the first model; iteratively executing the foregoing operations until a preset condition is satisfied; and in response to the preset condition being satisfied, determining an optimal quantization parameter and using, as a final quantization model, the first model that executes quantization based on the optimal quantization parameter.

The determining of the second model may include: executing quantization annotation on each operator to be quantized in the first model; determining a simulation quantization model; executing quantization configuration on the simulation quantization model based on the quantization parameter; calculating a quantization coefficient based on a simulation quantization model determined in response to the quantization configuration; and determining the second model by executing model reconfiguration on the simulation quantization model based on the quantization coefficient.

The multi optimization target parameter may include any one or any combination of any two or more parameters among accuracy, a size of the quantization model, energy consumption, and inference latency.

The calculating of the loss function may include calculating the loss function based on a difference value between the real value and the expected value of the multi optimization target parameter and a difference value between the real value and the constraint value of the multi optimization target parameter.

The loss function may be represented as $$\mathrm{loss}_{t+c} = \sum_{j=1}^{M} F(o_j, c_j, t_j, w_j, \lambda_j) = \sum_{j=1}^{M} w_j \times \Delta_{t_j}^2 + \sum_{j=1}^{M} \lambda_j \times \left(\max\left(0, \Delta_{c_j}\right)\right)^2,$$

wherein t denotes the expected value, and $t \in R_+$ denotes an expected value of a single optimization target parameter, c denotes the constraint value, and $c \in R_+$ denotes a constraint value of the single optimization target parameter, o denotes the real value, and $o \in R_+$ denotes a real value of a specific optimization target parameter of a current quantization model, $$\Delta tj = t_j - o_j$$

denotes the difference value between the real value and the expected value, $$\Delta_{cj} = c_j - o_j$$

denotes the difference value between the real value and the constraint value, wj denotes a weighting factor, $w \in R_+$, and $$\Delta_{tj}^2$$

is an optimization term, wherein, for minimizing a loss, an importance of each optimization target parameter is adjusted by the weighting factor, a term $$w_j \times \Delta_{tj}^2$$

is used to evaluate each optimization target parameter by a final result, $\lambda_j$ denotes a penalty factor and $\lambda \in R_+$, (max (0, $\Delta_{cj}$))$^2$ is a penalty term, wherein, in response to the real value of the specific optimization target parameter of the second model exceeding the constraint value, a penalty is assigned such that each optimization target parameter reaches a constraint, and M denotes a total number of optimization target parameters.

The updating of the quantization parameter may include determining and recording a new quantization parameter set of the second model based on a function value of the loss function and a target algorithm, wherein the target algorithm may include a Bayesian optimization algorithm; and replacing a current quantization parameter of the second model using the new quantization parameter set.

The determining of the optimal quantization parameter may include in response to the preset condition being satisfied, using, as the optimal quantization parameter, a set that minimizes the function value of the loss function among a plurality of quantization parameter sets recorded by screening, wherein the preset condition is satisfied in response to the number of iterations of the operations reaching a preset number, or in response to an iteration time reaching a preset iteration time.

A precision type corresponding to the quantization parameter may include any one or any combination of any two or more categories among INT4, INT8, and INT16.

In another general aspect, one or more embodiments include a non-transitory computer-readable storage medium storing instructions that, when executed by one or more processors, configure the one or more processors to perform any one, any combination, or all operations and methods described herein.

In another general aspect, an electronic device includes: one or more processors; and one or more memories storing instructions that, when executed by the one or more processors, configure the one or more processors to perform any one, any combination, or all operations and methods described herein.

In another general aspect, an apparatus with quantization for a deep learning model includes: a mixed precision quantization module configured to: determine a second model by quantizing a first model based on a quantization parameter; and determine a real value of a multi optimization target parameter by testing the second model; a multi-target optimization module configured to calculate a loss function based on the real value of the multi optimization target parameter, an expected value of the multi optimization target parameter, and a constraint value of the multi optimization target parameter; and an automatic optimization module configured to: update the quantization parameter based on the loss function and use the second model as the first model; and in response to a result of updating the quantization parameter satisfying a preset condition, determine an optimal quantization parameter and use, as a final quantization model, the first model that executes quantization based on the optimal quantization parameter.

For determining of the second model, the mixed precision quantization module may be configured to: execute quantization annotation on each operator to be quantized in the first model; determine a simulation quantization model; execute quantization configuration on the simulation quantization model based on the quantization parameter; calculate a quantization coefficient based on a simulation quantization model determined in response to the quantization configuration; and determine the second model by executing model reconfiguration on the simulation quantization model based on the quantization coefficient.

The multi optimization target parameter may include any one or any combination of any two or more parameters among accuracy, a size of the quantization model, energy consumption, and inference latency.

For the calculating of the loss function, the multi-target optimization module may be configured to calculate the loss function based on a difference value between the real value and the expected value of the multi optimization target parameter and a difference value between the real value and the constraint value of the multi optimization target parameter.

For the updating of the quantization parameter, the automatic optimization module may be configured to: determine and record a new quantization parameter set of the second model based on a function value of the loss function and a target algorithm, wherein the target algorithm may include a Bayesian optimization algorithm; and replace a current quantization parameter of the second model using the new quantization parameter set.

A precision type corresponding to the quantization parameter may include any one or any combination of any two or more categories among INT4, INT8, and INT16.

In another general aspect, an apparatus with quantization for a deep learning model includes: one or more processors configured to: determine a second model by quantizing, for each of a plurality of layers of a first model, either one or both of an activation value and a weight based on a quantization parameter; determine a value of a multi optimization target parameter based on the second model; determine a loss based on the value of the multi optimization target parameter, an expected value of the multi optimization target parameter, and a constraint value of the multi optimization target parameter; update the quantization parameter based on the loss and use the second model as the first model; and update the first model to execute quantization based on the updated quantization parameter.

The one or more processors may be configured to determine the value of the multi optimization target parameter by inputting a test data set to the second model.

For each of the layers of the first model, the quantization parameter may correspond to a precision type of either one or both of the activation value the weight.

For the determining of the second model, the one or more processors may be configured to convert, for each of the layers of the first model, a floating-point operator into an integer operator having a precision of the quantization parameter.

Other features and aspects will be apparent from the following detailed description, the drawings, and the claims.

Figure 1:
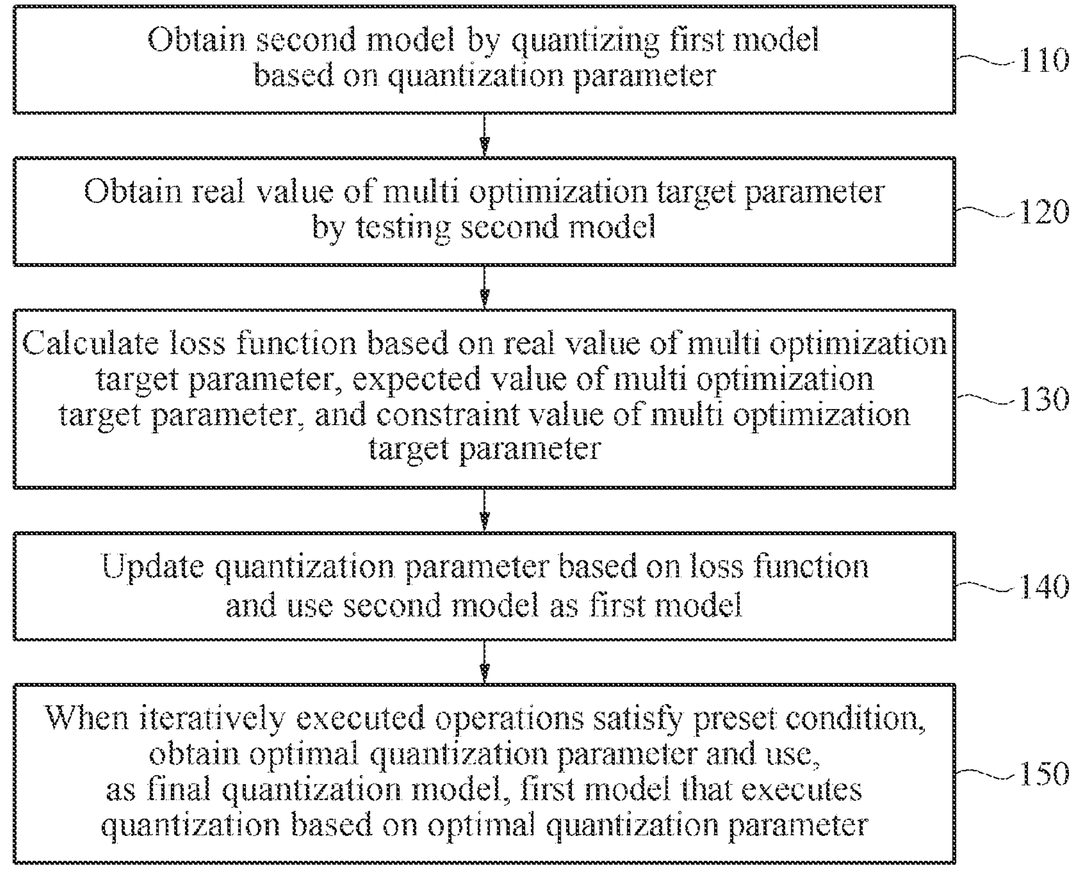
FIG. 1 is a flowchart illustrating an example of a quantization method for a deep learning model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, each of expressions, "between" and "immediately between," for example, and "adjacent to" and "immediately adjacent to," for example, should also be respectively construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

A quantization method for a deep learning model is described herein. FIG. 1 is a flowchart illustrating an example of a quantization method for a deep learning model. Referring to FIG. 1, the quantization method may include operations 110 through 150 to be iteratively executed until a preset condition is satisfied.

In operation 110, a second model may be obtained by quantizing a first model based on a quantization parameter.

Figure 5:
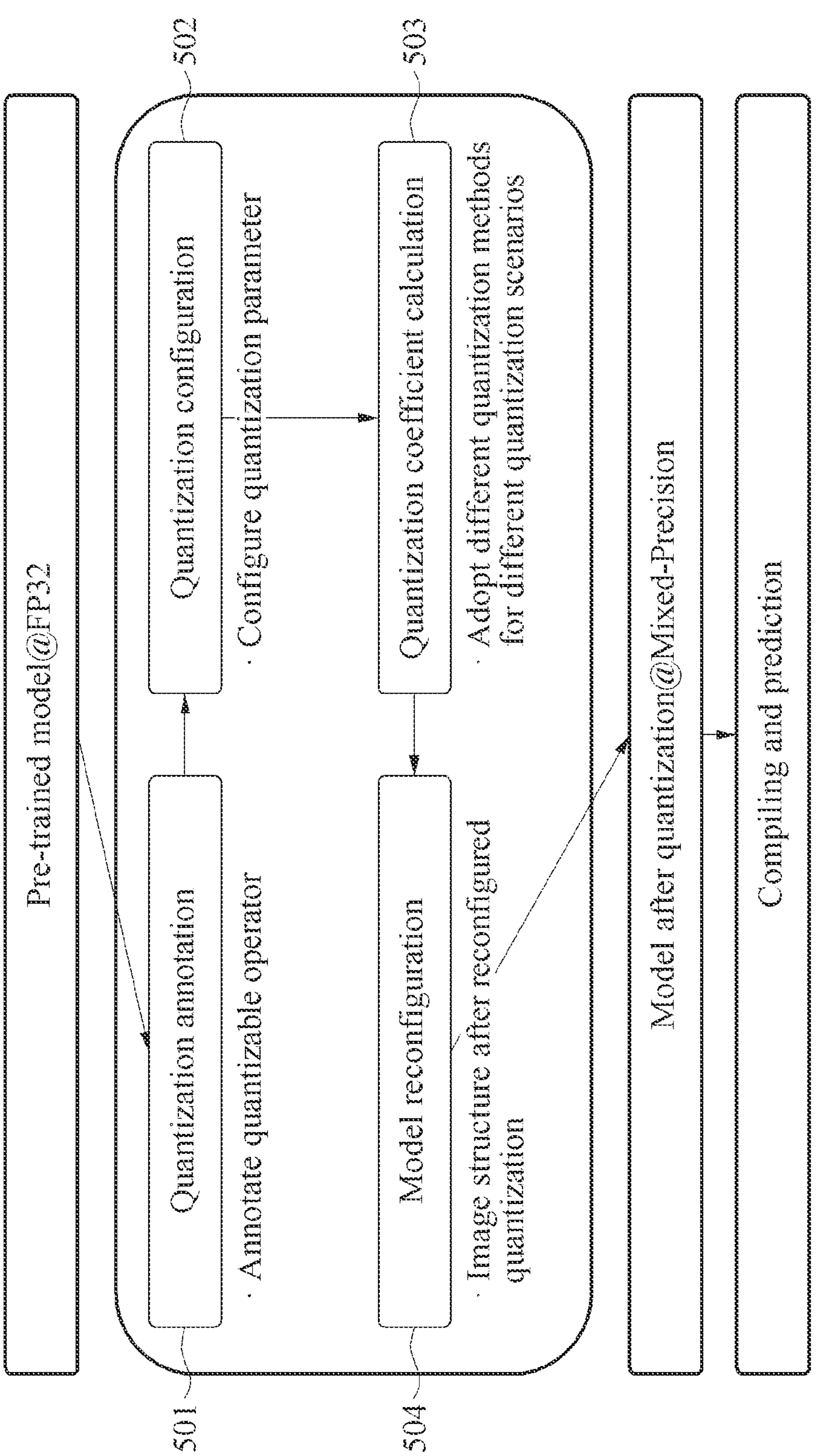
FIG. 5 is a diagram illustrating an example of execution of quantization.

Operation 110 may be performed as follows. In a non-limiting example, operation 110 may be divided into the following four steps A through D as illustrated in FIG. 5. Step A (e.g., operation 501 of FIG. 5) may be for quantization annotation, step B (e.g., operation 502 of FIG. 5) may be for quantization configuration, step C (e.g., operation 503 of FIG. 5) may be for calculation of a quantization coefficient, and step D (e.g., operation 504 of FIG. 5) may be for model reconfiguration.

In step A, the quantization annotation may be performed on each operator to be quantized in the first model, and a simulation quantization model may be obtained. In step B, the quantization configuration may be performed on the simulation quantization model based on the quantization parameter. In step C, a quantization coefficient may be calculated based on a simulation quantization model obtained after the quantization configuration. In step D, the model reconfiguration may be performed on the simulation quantization model based on the quantization coefficient, and the second model may thereby be obtained.

Figure 3:
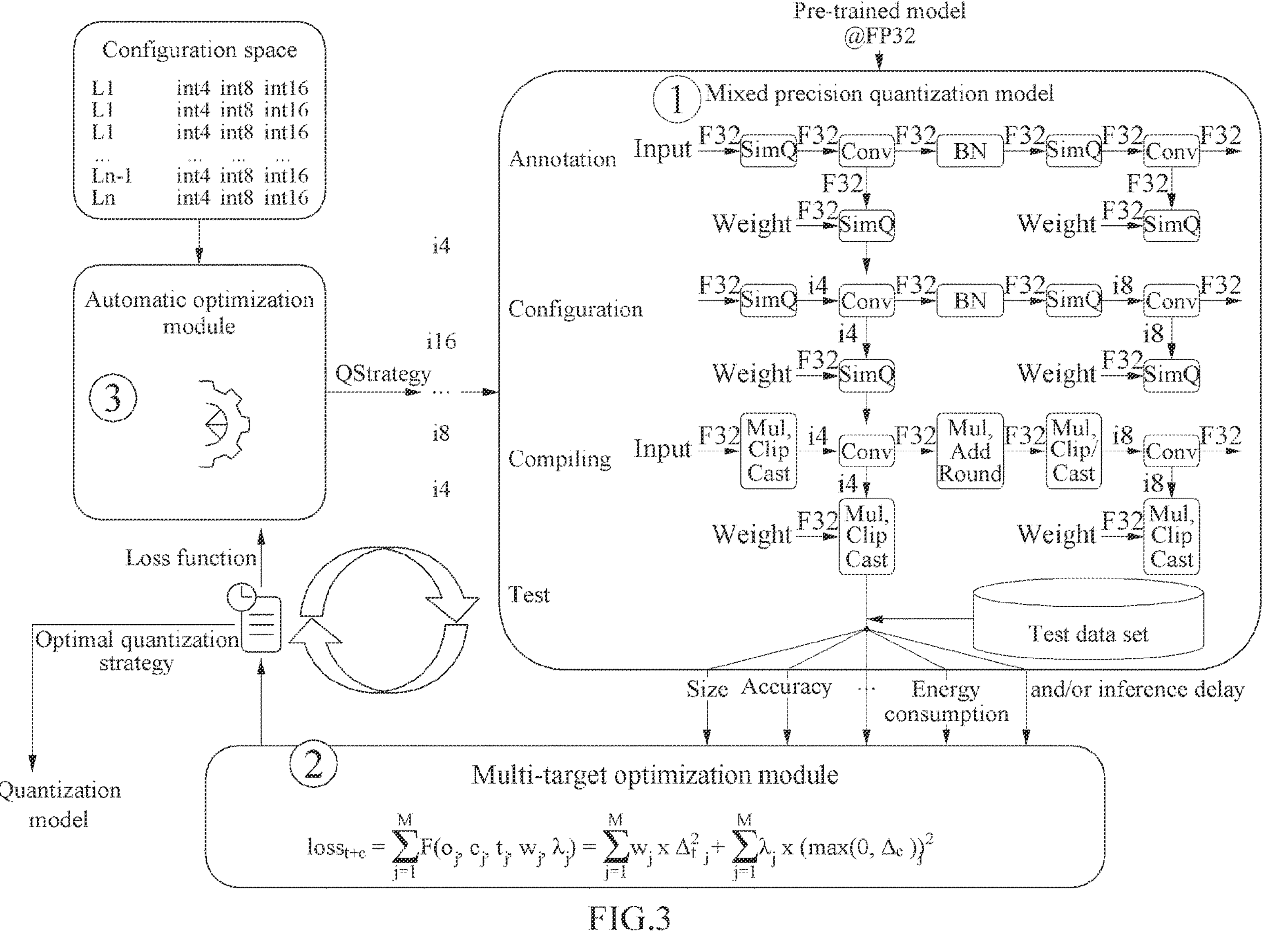
FIG. 3 is a diagram illustrating an example of automatic multi-target quantization of a quantization method for a deep learning model.
Figure 4:
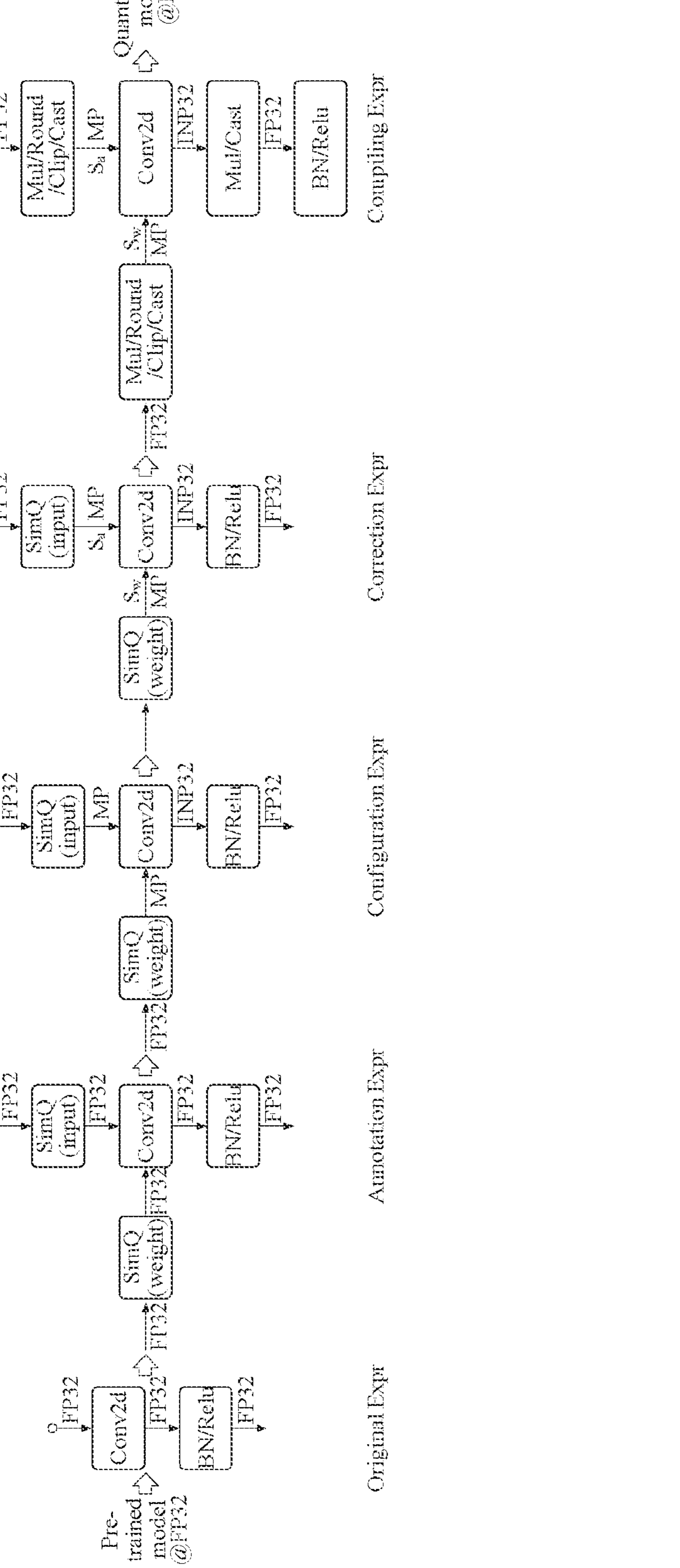
FIG. 4 is a diagram illustrating an example of quantization of a convolution operator.

The first model may be a model that is trained in advance, for example, a pre-trained model illustrated in FIG. 3, 4, or 5 (e.g., the pre-trained model @FP32 in FIG. 3, 4 or 5). A precision type corresponding to the quantization parameter may include, for example, INT4, INT8, and/or INT16, in which INT denotes an integer.

Step A may include inserting a simulation quantization operator into each operator to be quantized. The simulation quantization operator may include a simulation quantization operator for quantizing a weight, and a simulation quantization operator for quantizing an activation value.

For example, in Step A, referring to FIG. 4, for a convolution operator (e.g., Conv2d), an inserted SimQ operator (weight) may be the simulation quantization operator for quantizing a weight, and SimQ operator (input) may be the simulation quantization operator for quantizing an activation value.

Selectively, when quantization is executed, uniform quantization may be executed. For example, the simulation quantization operator for quantizing a weight may adopt asymmetric quantization, and the simulation quantization operator for quantizing an activation value may adopt symmetric quantization. The simulation quantization operator for quantizing a weight may also adopt the symmetric quantization, and the simulation quantization operator for quantizing an activation value may also adopt the asymmetric quantization.

For example, step B may include analyzing a corresponding relationship between the quantization parameter and a layer-level order of an operator in the simulation quantization model, and configuring the quantization parameter as the operator based on the correspondence relationship.

In step B, the quantization parameter may be generated by an optimizer based on a loss function, a non-limiting example of which will be described in detail later. The corresponding relationship between a parameter of a quantization parameter array and a layer-level operator of the simulation quantization model may correspond to one-to-one mapping. For example, referring to FIG. 6, a layer array may represent a quantization parameter, and a corresponding quantization parameter may be configured as a corresponding operator. In this example, parameters 4, 8, and 16 may respectively represent precision types INT4, INT8, and INT16 of data of the simulation quantization operator.

For example, referring to FIG. 4, a specific convolution layer (Conv2d) in a pre-trained model may originally execute a floating-point operation, for example, a floating-point format (FP32) operation, and simulate quantization of a quantization operator to implement a conversion from FP32 to INT8. Thus, Conv2d may execute INT8 calculation. In this example, FP represents floating-point data. The function of step B may be to determine a precision at which each of a plurality of operators (e.g., convolution layers) executing calculations in the model is to perform the calculations.

Step C may include determining a precision type of data corresponding to a quantized quantization parameter of each inserted simulation quantization operator in the simulation quantization model, simulating an intercepting error and a rounding error from the floating-point data to the integer data based on a mapping relationship between the floating-point data and the data of the precision type, and adopting a method of calculating a quantization coefficient of each simulated quantization operator.

Figure 6:
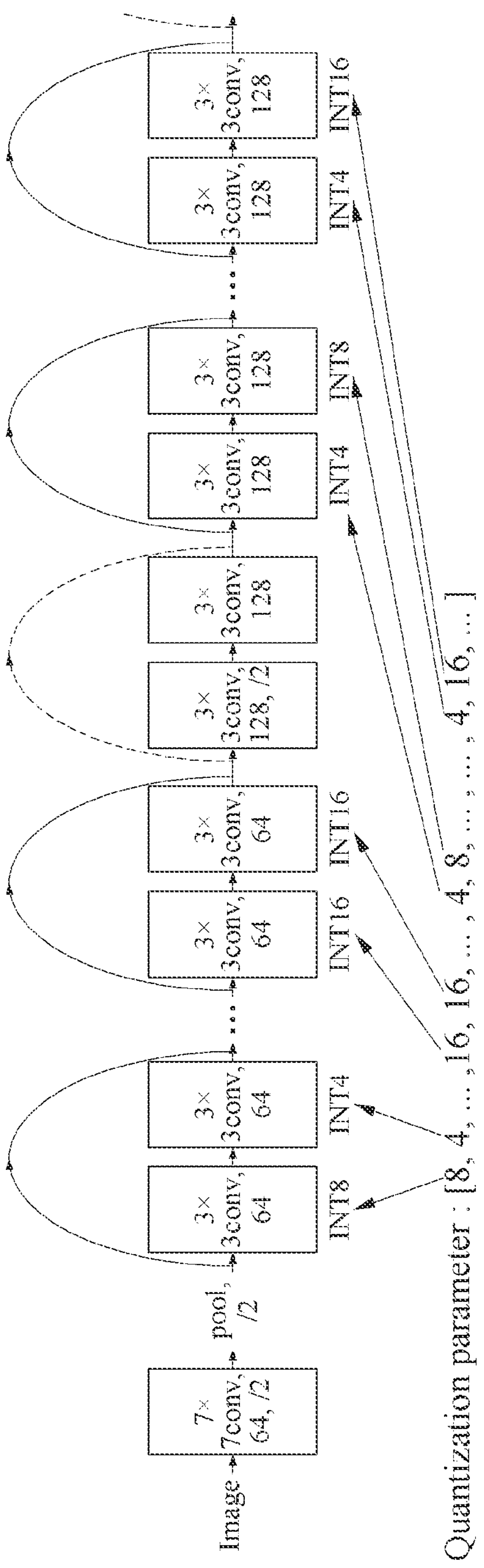
FIG. 6 is a diagram illustrating an example of quantization configuration.

Referring to FIG. 6, a configured quantization parameter may be [8, 4, . . . 16, 16, . . . 4, 8, . . . 4, 16, . . . ]. A value 4 may indicate that a precision type of data corresponding to the configured quantization parameter is INT4. Similarly, a value 8 may correspond to INT8, and a value 16 may correspond to INT16.

The mapping relationship between the floating-point data and the data of the precise type may be obtained in advance, as will be understood, and thus a detailed description thereof will be omitted here.

The simulation intercepting error and rounding error may be implemented as follows. For example, Kullback-Leibler divergence (KLD) and min/max methods may be used to intercept an activation value and round off. The min/max method may be used for rounding by intercepting a weight value. Subsequently, based on a comparison between the original floating-point data and the intercepted and rounded value, the intercepting error and the rounding error may be determined.

Subsequently, the quantization coefficient of each simulation quantization operator may be determined based on the mapping relationship, the intercepting error, and the rounding error. The quantization coefficient may be used to allow data obtained after quantization to be closest to an original data distribution. The quantization coefficient may include a scale factor and a zero point.

Step D may include, for each simulation quantization operator in the simulation quantization model, determining a quantization-configured quantization parameter of a corresponding simulation quantization operator and a quantization coefficient corresponding to the quantization parameter, and adopting a method of replacing the simulation quantization operator using a low-precision operator that supports the quantization parameter and the quantization coefficient.

In step D, the replacing may be construed as being executed in various available methods. For example, referring to FIG. 4, a simulation operator may be processed using Mul, Round, Clip, and Cast functions, and a low-precision operator may be obtained. The Mul function may be FP32*1/scale, which indicates one that is obtained by dividing floating-point data by a scale. The Round function will be described in conjunction with the following example. Round(Mul(FP32/scale)), s2^(bit-1), +2^(bit-1)−1) may indicate that a value less than −2^(bit-1) is set to be +2^(bit-1). For example, when an operator is selected as INT4, it may be 4 bit and −2^(bit-1) may be −8, and a value greater than +2^(bit-1) may be set to be +2^(bit-1)−1. When a precision of an operator is selected as INT4, it may be 4 bit and +2^(bit-1)−1 may be +7. For example, a value greater than +7 may be set to be +7. The Cast function may be to convert an FP32 type into an INT type, and (FP32)+7->(INT4)+7).

To ensure accuracy of low-precision quantization in a quantization execution process, a model may be quantized based on a quantization parameter, and different quantization modes may be adopted based on precision types of different quantization parameters. For example, INT8 and INT16 may adopt a layer-level quantization mode, and INT4 may adopt a channel-level quantization mode. A high-precision operator may be used to ensure the accuracy, and a low-precision operator may be used to prevent a quantification issue caused by a fixed precision of the model and a reduced compression effect by compressing a model size and an inference latency (or delay). In addition, by mixing high-precision quantization and low-precision quantization, a quantization apparatus of one or more embodiments may ensure a high accuracy of the model without a fine adjustment. Referring back to FIG. 1, in operation 120, a real value of a multi optimization target parameter may be obtained by testing the second model.

Referring to FIGS. 3 and 5, Val.Data is a test data set, and the second model may be tested using the test data set Val.Data. For example, compiling and prediction may be performed on a quantized model (e.g., the second model), and the real value of the optimization parameter may be obtained.

The multi optimization target parameter described herein may include a size of a quantization model, accuracy, power, and/or inference latency (or delay). However, the multi optimization target parameter is not limited thereto, and may include other indicators that define the performance of the model.

In operation 130, a loss function may be calculated based on the real value of the multi optimization target parameter, an expected value of the multi optimization target parameter, and a constraint value of the multi optimization target parameter.

The loss function may be calculated as represented below. For example, the loss function may be calculated based on a difference value between the expected value and the real value of the multi optimization target parameter and a difference value between the constraint value and the real value of the multi optimization target parameter. The loss function may be represented as follows, for example.

$$\text{loss}_{t+c} = \sum_{j=1}^{M} F(o_j, c_j, t_j, w_j, \lambda_j) = \sum_{j=1}^{M} w_j \times \Delta_{t_j}^2 + \sum_{j=1}^{M} \lambda_j \times \left(\max\left(0, \Delta_{c_j}\right)\right)^2$$

In the equation above, t denotes the expected value, and $t \in R_+$ denotes an expected value of a single optimization target parameter. c denotes the constraint value, and $c \in R_+$ denotes a constraint of the single optimization target parameter. o denotes the real value, and $o \in R_+$ denotes a real value of a specific optimization target parameter of a current quantization model.

$$\Delta tj = t_j - o_j$$

denotes a difference value between the real value and the expected value.

$$\Delta_{cj} = c_j - o_j$$

denotes a difference value between real value and the constraint value. wj denotes a weighting factor, and $w \in R_+$.

$$\Delta_{tj}^2$$

may be an optimization term. When minimizing a loss, the importance of each optimization target parameter may be adjusted by the weighting factor even though each optimization target parameter is close to the expected value. The term $$w_j \times \Delta_{tj}^2$$

may be used to evaluate each optimization target parameter by a final result. $\lambda_j$ denotes a penalty factor, and $\lambda \in R_+$. $(\max(0, \Delta_{cj}))^2$ may be a penalty term. When the real value of the specific optimization target parameter of the second model exceeds the constraint, a penalty may be assigned such that each optimization target parameter reaches the constraint. M denotes a total number of optimization target parameters.

As described above, a final surrogate loss function may be obtained by combining the expected value and the constraint value of the multi optimization target parameter. When an output function value of the loss function is smaller, the model may be closer to Pareto optimality.

In operation 140, the quantization parameter may be updated based on the calculated loss function, and the second model may be used as the first model.

For example, in operation 140, the updating may be performed as follows. For example, the output function value of the loss function may be input to an optimizer. The optimizer may execute calculation based on the input function value and a target algorithm (e.g., an optimization algorithm), determine and record a new quantization parameter set of the second model, and replace a current quantization parameter of the second model using the new quantization parameter set. The target algorithm may include, for example, a Bayesian optimization algorithm. The target algorithm is not limited to the Bayesian optimization algorithm, but may include, for example, a reinforcement learning (RL) algorithm and a genetic algorithm.

In operation 150, when the iteratively executed operations satisfy a preset condition, an optimal quantization parameter may be obtained, and the first model that executes quantization based on the optimal quantization parameter may be used as a final quantization model.

Whether the operations iteratively executed before operation 150 satisfy the preset condition may be determined.

The iteratively executed operations may include operations 110 through 140. For example, when the preset condition is satisfied, a set that minimizes the output function value of the loss function among a plurality of quantization parameter sets recorded by screening may be used as the optimal quantization parameter. The preset condition may be satisfied when a number of iterations satisfies a preset number of iterations, or when an iteration time satisfies a preset iteration time.

The quantization method according to an example embodiment may further include setting an initial quantization parameter set for the first model in an initialization step, and a precision type thereof may include at least one category among INT4, INT8, and INT16.

The iterative execution of operations 110 through 140 may be triggered in an initial step until the initial quantization parameter set given to a pre-trained model satisfies the preset condition. Selectively, the precision type of the initial quantization parameter may all be set to be INT8.

Hereinafter, an example of the quantization method for a deep learning model will be described with reference to FIGS. 3 and 7.

Referring to FIG. 3, a mixed precision quantization module (e.g., MP-Quant) indicated by "①" may perform operations 110 and 120. For example, the mixed precision quantization module may convert an FP32 operator corresponding to each layer of an original floating-point model into an integer operator having a precision set in a quantization configuration module, and increase a calculation execution speed using a low-precision calculation unit, such as, for example, a neural processing unit (NPU) or a graphics processing unit (GPU). The mixed precision quantization module may simultaneously quantize an activation value and a weight corresponding to each layer (e.g., a convolution layer or a dense layer), and compile and evaluate a quantized model to obtain information (e.g., Acc. (accuracy), etc.). As described above, different quantization methods may be used for different precisions.

A multi-target optimization module (or a multi-objective optimization (MOO) module) indicated by "②" may be used to perform the operation 130. The multi-target optimization module may comprehensively quantize a plurality of target values, and convert an optimization operation into a comprehensive surrogate loss function. For real applications of a neural network model, many aspects may be considered. In addition to accuracy (or precision) of the model, a size of the model, an inference latency (or delay), energy consumption, and the like may also affect the applications of the neural network model to real scenes. In the real applications, there may be a conflict between targets such as the accuracy and the model size. A small model may generally result in a low quantitative accuracy, and each target of the model may be considered for comprehensive optimization. In the multi-target optimization module, the comprehensive surrogate loss function may be designed as output feedback of a quantization model for an optimizer for comprehensively optimizing various targets (e.g., accuracy, model size, inference time, etc.) simultaneously.

An automatic optimization module (or Auto-Opt) indicated by "③" may be used to perform operations 140 through 150. For example, the automatic optimization module may optimize a comprehensive optimal result (e.g., Pareto optimization). The optimizer may optimize a model to be quantized with a black-box function, and use a precision quantization configuration of each layer of the model as a hyperparameter. The optimizer may find a Pareto optimal through iterative optimization. In each iteration, the optimizer may receive, as an input, a result of a previous hyperparameter affecting the model, and adjust a posteriori probability distribution of the optimizer and then generate a new hyperparameter for a subsequent iteration. When the number of iterations reaches a preset target or when an optimization period is set in advance, the optimizer may suspend the optimization and output an optimal Pareto strategy or an optimal mixed precision configuration (or an optimal quantization parameter). A configuration space illustrated in FIG. 3 may be used to provide a filter data set for the optimizer.

As illustrated in FIG. 3, optimization may be iteratively performed under the preset condition, an optimal quantization parameter set may be selected to be an optimal quantization strategy (e.g., Best QStrategy), and a model may be quantized according to the optimal quantization strategy to obtain a final quantization model.

Figure 7:
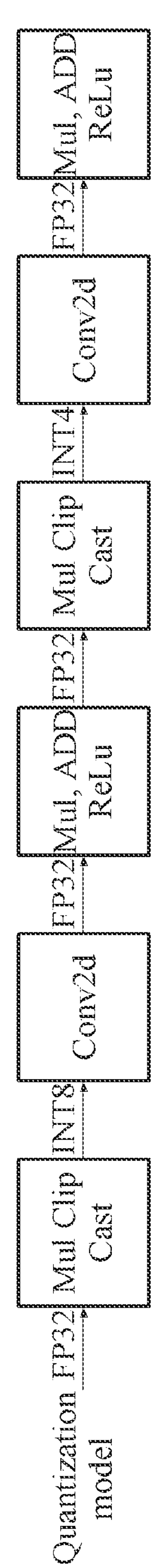
FIG. 7 is a diagram illustrating an example of model representation fragments after quantization of an initial model in a quantization method for a deep learning model.

As illustrated in FIG. 7, for a convolution operator (e.g., Conv2d), a corresponding FP3 floating-point operator may be converted into an INT4 or INT8 precision integer operator, by combining quantized model representation fragments. For a detailed description of the conversion, reference may be made to the descriptions of steps A through D of operation 110 and a repeated description will be omitted here.

Figure 2:
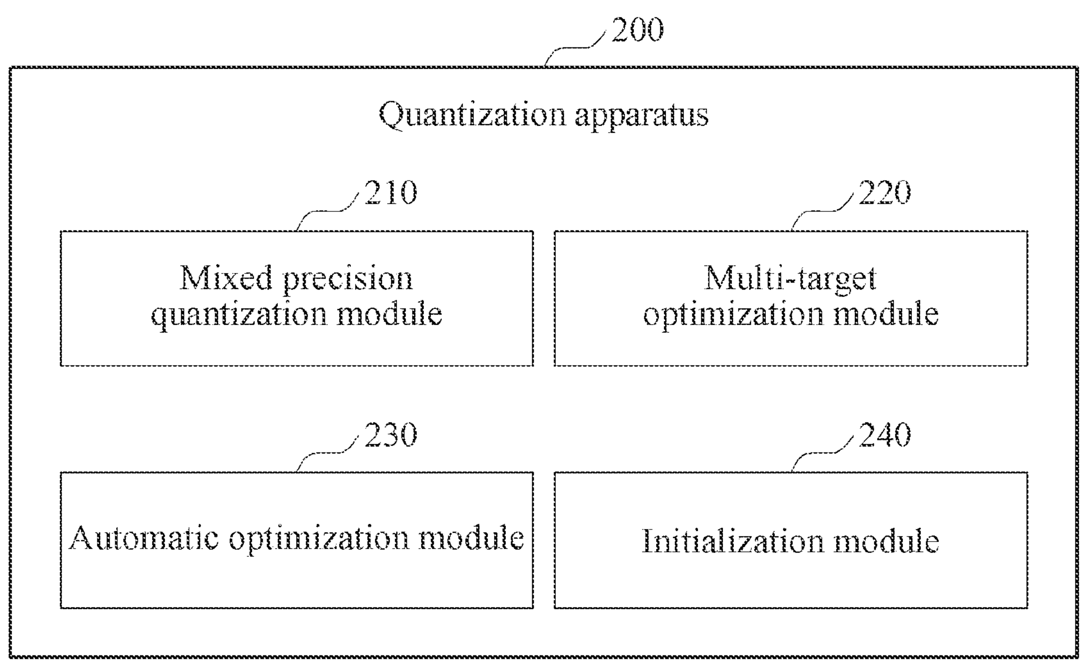
FIG. 2 is a diagram illustrating an example of a quantization apparatus for a deep learning model.

According to another example embodiment, there is provided a quantization apparatus for a deep learning model. Referring to FIG. 2, a quantization apparatus 200 may include a mixed precision quantization module 210, a multi-target optimization module 220, an automatic optimization module 230, and an initialization module 240. These modules may be connected to one another.

The mixed precision quantization module 210 may obtain a second model by quantizing a first model based on a quantization parameter, and obtain a real value of a multi optimization target parameter by testing the second model. The multi-target optimization module 220 may calculate a loss function based on the real value of the multi optimization target parameter, an expected value of the multi optimization target parameter, and a constraint value of the multi optimization target parameter. The automatic optimization module 230 may update the quantization parameter and use the second model as the first model based on the calculated loss function. When a preset condition is satisfied, the automatic optimization module 230 may obtain an optimal quantization parameter and use, as a final quantization model, the first model that executes quantization based on the optimal quantization parameter.

The foregoing description of the quantization method for a deep learning model may be applied to the quantization apparatus for a deep learning model for similar expansion. Thus, a more detailed and repeated description will be omitted here for the convenience of description.

Selectively, the mixed precision quantization module 210 may obtain a simulation quantization model by executing quantization annotation on each operator to be quantized in the first model, execute quantization configuration on the simulation quantization model based on the quantization parameter, calculate a quantization coefficient based on a simulation quantization model obtained after the quantization configuration, and obtain the second model by executing model reconfiguration on the simulation quantization model based on the quantization coefficient.

Selectively, the mixed precision quantization module 210 may insert a simulation quantization operator into each operator to be quantized. The simulation quantization operator may include a simulation quantization operator for quantizing a weight and a simulation quantization operator for quantizing an activation value.

Selectively, the mixed precision quantization module 210 may analyze a corresponding relationship between the quantization parameter and a layer-level order of an operator in the simulation quantization model, and configure the quantization parameter as the operator based on the corresponding relationship.

Selectively, the mixed precision quantization module 210 may determine a precision type of data corresponding to a quantized quantization parameter of each inserted simulation quantization operator in the simulation quantization model, simulate an intercepting error and a rounding error from floating-point data to integer data based on a mapping relationship between the floating-point data and the data of the precision type, and calculate a quantization coefficient of each simulated quantization operator.

Selectively, the mixed precision quantization module 210 may determine a quantization parameter obtained by the quantization configuration on a corresponding simulation quantization operator and a corresponding quantization coefficient, with respect to each simulation quantization operator in the simulation quantization model, and replace the simulation quantization operator using a low-precision operator that supports the quantization parameter and the quantization coefficient.

Here, the target parameter may include at least one parameter among accuracy, a size of the quantization model, energy consumption, and inference latency (or delay).

Selectively, the multi-target optimization module 220 may calculate a loss function based on a difference value between an expected value of the multi optimization target parameter and a corresponding real value, and on a difference value between a constraint value of the multi optimization target parameter and the corresponding real value. The loss function may be represented as follows, for example.

$$\mathrm{loss}_{t+c} = \sum_{j=1}^{M} F(o_j, c_j, t_j, w_j, \lambda_j) = \sum_{j=1}^{M} w_j \times \Delta_{t_j}^2 + \sum_{j=1}^{M} \lambda_j \times \left(\max\left(0, \Delta_{c_j}\right)\right)^2$$

In the equation above, t denotes the expected value, and $t \in R_+$ denotes an expected value of a single optimization target parameter. c denotes a constraint value, and $c \in R_+$ denotes a constraint of the single optimization target parameter. o denotes the real value, and $o \in R_+$ denotes a real value of a specific optimization target parameter of a current quantization model.

$$\Delta tj = t_j - o_j$$

denotes the difference value between the real value and the expected value, and $$\Delta_{cj} = c_j - o_j$$

denotes the difference value between the real value and the constraint value. wj denotes a weighting factor, and $w \in R_+$.

$$\Delta_{tj}^2$$

is an optimization term. When minimizing a loss, the importance of each optimization target parameter may be adjusted by the weighting factor even though each optimization target parameter is close to the expected value. The term, $$w_j \times \Delta_{tj}^2,$$

may allow a final result to evaluate each optimization target parameter. $\lambda_j$ denotes a penalty factor, and $\lambda \in R_+$. $(\max(0, \Delta_{cj}))^2$ is a penalty term. When the real value of the specific optimization target parameter of the second model exceeds the constraint, the penalty may be given such that each optimization target parameter reaches the constraint condition. M denotes a total number of optimization target parameters.

Selectively, the automatic optimization module 230 may determine and record a new quantization parameter set of the second model based on an output function value of the loss function and a target algorithm, and replace a current quantization parameter of the second model using the new quantization parameter set. The target algorithm may include, for example, a Bayesian optimization algorithm.

Selectively, when a preset condition is satisfied, the automatic optimization module 230 may use, as an optimal parameter value, a set that minimizes the output function value of the loss function among a plurality of quantization parameter sets recorded by screening. The preset condition may be satisfied when the number of iterations satisfies a preset number of iterations, or when an iteration time satisfies a preset iteration time.

Selectively, a precision type corresponding to the quantization parameter may include at least one category among INT4, INT8, and INT16.

Selectively, the quantization apparatus 200 may further include the initialization module 240 configured to set an initial quantization parameter set for the first model in an initialization step. The precision type thereof may include at least one category among INT4, INT8, and/or INT16.

According to an example embodiment, each unit or module of a quantization system for a deep learning model may be implemented as a hardware and/or software component. A person skilled in the art may implement each unit or module using, for example, a field-programmable gate array (FPGA) or an application-specific integrated circuit (ASIC), according to a process performed in each defined unit or module.

Figure 8:
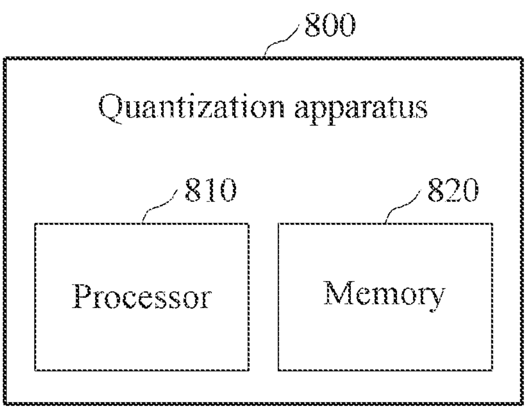
FIG. 8 is a diagram illustrating an example of a quantization apparatus for a deep learning model.

FIG. 8 is a block diagram illustrating an example of a quantization apparatus. Referring to FIG. 8, a quantization apparatus 800 includes a processor 810 (e.g., one or more processors) and a memory 820 (e.g., one or more memories). The quantization apparatus 800 may be or include the quantization apparatus 200 of FIG. 2. The memory 820 may be connected to the processor 810 and may store instructions executable by the processor 810, data to be operated by the processor 810, or data processed by the processor 810. The memory 820 may include a non-transitory computer-readable medium (for example, a high-speed random access memory) and/or a non-volatile computer-readable medium (for example, at least one disk storage device, flash memory device, or another non-volatile solid-state memory device).

The processor 810 may execute the instructions to perform any one or more or all of the operations and methods described above with reference to FIGS. 1 through 7. For example, the processor 810 may determine a second model by quantizing a first model based on a quantization parameter, determine a real value of a multi optimization target parameter by testing the second model, calculate a loss function based on the real value of the multi optimization target parameter, an expected value of the multi optimization target parameter, and a constraint value of the multi optimization target parameter, update the quantization parameter based on the loss function and use the second model as the first model, and, in response to a result of updating the quantization parameter satisfying a preset condition, determine an optimal quantization parameter and use, as a final quantization model, the first model that executes quantization based on the optimal quantization parameter. The processor 810 may include the mixed precision quantization module 210, the multi-target optimization module 220, the automatic optimization module 230, and the initialization module 240 of FIG. 2.

The quantization apparatuses, mixed precision quantization modules, multi-target optimization modules, automatic optimization modules, initialization modules, processors, memories, quantization apparatus 200, mixed precision quantization module 210, multi-target optimization module 220, automatic optimization module 230, initialization module 240, quantization apparatus 800, processor 810, memory 820, and other apparatuses, devices, units, modules, and components described herein with respect to FIGS. 1 through 8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A method with quantization for a deep learning model, comprising:

determining a second model by quantizing a first model based on a quantization parameter;

determining a real value of a multi optimization target parameter by testing the second model;

determining a loss function based on the real value of the multi optimization target parameter, an expected value of the multi optimization target parameter, and by assigning a penalty in response to a real value of a specific target parameter of the multi optimization target parameter exceeding a constraint value of the multi optimization target parameter, wherein a value of the penalty is determined based on a penalty factor and a difference value between the real value of the specific target parameter and the constraint value;

updating the quantization parameter based on the loss function and determining the second model as the first model;

iteratively executing the foregoing operations until a preset condition is satisfied; and in response to the preset condition being satisfied, determining an optimal quantization parameter and using, as a final quantization model, the first model that is quantized based on the optimal quantization parameter, wherein the determining of the second model comprises:

determining a simulation quantization model using the first model, for mapping the quantization parameter with each operator to be quantized in the first model; and determining the second model by executing model reconfiguration on the simulation quantization model based on a quantization coefficient, the quantization coefficient comprising a scale factor and a zero point.

2. The method of claim 1, wherein the determining of the simulation quantization model comprises:

determining the simulation quantization model by inserting a simulation quantization operator into the each operator to be quantized in the first model, wherein the each operator to be quantized comprises a weight or an activation; and executing quantization configuration on the simulation quantization model based on the quantization parameter, wherein the quantization parameter is mapped with the simulation quantization operator of each layer in the simulation quantization model, and the method further comprises:

determining the quantization coefficient based on the simulation quantization model determined in response to the quantization configuration.

3. The method of claim 1, wherein the multi optimization target parameter comprises any one or any combination of any two or more parameters among accuracy, a size of the quantization model, energy consumption, and inference latency.

4. The method of claim 1, wherein the determining of the loss function comprises:

determining the loss function based on a difference value between the real value and the expected value of the multi optimization target parameter and a difference value between the real value and the constraint value of the multi optimization target parameter.

5. The method of claim 4, wherein the loss function is represented as $$\text{loss}_{t+c} = \sum_{j=1}^{M} F(o_j, c_j, t_j, w_j, \lambda_j) = \sum_{j=1}^{M} w_j \times \Delta_{t_j}^2 + \sum_{j=1}^{M} \lambda_j \times \left(\max\left(0, \Delta_{c_j}\right)\right)^2,$$

wherein t denotes the expected value, and $t \in R_+$ denotes an expected value of a single optimization target parameter, c denotes the constraint value, and $c \in R_+$ denotes a constraint value of the single optimization target parameter, o denotes the real value, and $o \in R_+$ denotes a real value of a specific optimization target parameter of a current quantization model, $$\Delta tj = t_j - o_j$$

denotes the difference value between the real value and the expected value, $$\Delta_{cj} = c_j - o_j$$

denotes the difference value between the real value and the constraint value, wj denotes a weighting factor, $w \in R_+$, and $$\Delta_{tj}^2$$

is an optimization term, wherein, for minimizing a loss, an importance of each optimization target parameter is adjusted by the weighting factor, a term $$w_j \times \Delta_{tj}^2$$

is used to evaluate each optimization target parameter by a final result, $\lambda_j$ denotes the penalty factor and $\lambda \in R_+$, $(\max(0, \Delta_{cj}))^2$ is a penalty term, wherein, in response to the real value of the specific optimization target parameter of the second model exceeding the constraint value, the penalty is assigned such that each optimization target parameter reaches a constraint, and M denotes a total number of optimization target parameters.

6. The method of claim 1, wherein the updating of the quantization parameter comprises:

determining and recording a new quantization parameter set of the second model based on a function value of the loss function and a target algorithm, wherein the target algorithm comprises a Bayesian optimization algorithm; and replacing a current quantization parameter of the second model using the new quantization parameter set.

7. The method of claim 6, wherein the determining of the optimal quantization parameter comprises:

in response to the preset condition being satisfied, using, as the optimal quantization parameter, a set that minimizes the function value of the loss function among a plurality of quantization parameter sets recorded by screening, wherein the preset condition is satisfied in response to the number of iterations of the operations reaching a preset number, or in response to an iteration time reaching a preset iteration time.

8. The method of claim 1, wherein a precision type corresponding to the quantization parameter comprises any one or any combination of any two or more categories among INT4, INT8, and INT16.

9. A non-transitory computer-readable storage medium storing instructions that, when executed by one or more processors, configure the one or more processors to perform the method of claim 1.

10. An electronic device, comprising:

one or more processors; and one or more memories storing instructions that, when executed by the one or more processors, configure the one or more processors to perform the method of claim 1.

11. An apparatus with quantization for a deep learning model, comprising:

one or more processors configured to:

determine a second model by quantizing a first model based on a quantization parameter;

determine a real value of a multi optimization target parameter by testing the second model;

determine a loss function based on the real value of the multi optimization target parameter, an expected value of the multi optimization target parameter, and by assigning a penalty in response to a real value of a specific target parameter of the multi optimization target parameter exceeding a constraint value of the multi optimization target parameter, wherein a value of the penalty is determined based on a penalty factor and a difference value between the real value of the specific target parameter and the constraint value;

update the quantization parameter based on the loss function and use the second model as the first model; and in response to a result of updating the quantization parameter satisfying a preset condition, determine an optimal quantization parameter and use, as a final quantization model, the first model that is quantized based on the optimal quantization parameter, wherein the determining of the second model comprises:

determining a simulation quantization model using the first model, for mapping the quantization parameter with each operator to be quantized in the first model; and determining the second model by executing model reconfiguration on the simulation quantization model based on a quantization coefficient, the quantization coefficient comprising a scale factor and a zero point.

12. The apparatus of claim 11, wherein, for determining of the simulation quantization, the one or more processors are configured to:

determine the simulation quantization model by inserting a simulation quantization operator into the each operator to be quantized in the first model, wherein the each operator to be quantized comprises a weight or an activation; and execute quantization configuration on the simulation quantization model based on the quantization parameter, wherein the quantization parameter is mapped with the simulation quantization operator of each layer in the simulation quantization model, and;

the one or more processors are further configured to:

determine the quantization coefficient based on the simulation quantization model determined in response to the quantization configuration.

13. The apparatus of claim 11, wherein the multi optimization target parameter comprises any one or any combination of any two or more parameters among accuracy, a size of the quantization model, energy consumption, and inference latency.

14. The apparatus of claim 11, wherein, for the determining of the loss function, the one or more processors are configured to:

determine the loss function based on a difference value between the real value and the expected value of the multi optimization target parameter and a difference value between the real value and the constraint value of the multi optimization target parameter.

15. The apparatus of claim 11, wherein, for the updating of the quantization parameter, the one or more processors are configured to:

determine and record a new quantization parameter set of the second model based on a function value of the loss function and a target algorithm, wherein the target algorithm comprises a Bayesian optimization algorithm; and replace a current quantization parameter of the second model using the new quantization parameter set.

16. The apparatus of claim 11, wherein a precision type corresponding to the quantization parameter comprises any one or any combination of any two or more categories among INT4, INT8, and INT16.

17. An apparatus with quantization for a deep learning model, comprising:

one or more processors configured to:

determine a second model by quantizing, for each of a plurality of layers of a first model, either one or both of an activation value and a weight based on a quantization parameter;

determine a value of a multi optimization target parameter based on the second model;

determine a loss based on the value of the multi optimization target parameter, an expected value of the multi optimization target parameter, and by assigning a penalty in response to a real value of a specific target parameter of the multi optimization target parameter exceeding a constraint value of the multi optimization target parameter, wherein a value of the penalty is determined based on a penalty factor and a difference value between the real value of the specific target parameter and the constraint value;

update the quantization parameter based on the loss and use the second model as the first model; and update the first model to execute quantization based on the updated quantization parameter, wherein the determining of the second model comprises:

determining a simulation quantization model using the first model, for mapping the quantization parameter with each operator to be quantized in the first model; and determining the second model by executing model reconfiguration on the simulation quantization model based on a quantization coefficient, the quantization coefficient comprising a scale factor and a zero point.

18. The apparatus of claim 17, wherein the one or more processors are configured to determine the value of the multi optimization target parameter by inputting a test data set to the second model.

19. The apparatus of claim 17, wherein, for each of the layers of the first model, the quantization parameter corresponds to a precision type of either one or both of the activation value the weight.

20. The apparatus of claim 17, wherein, for the determining of the second model, the one or more processors are configured to convert, for each of the layers of the first model, a floating-point operator into an integer operator having a precision of the quantization parameter.

* * * * *